US008955487B2

(12) United States Patent
Hampton et al.

(10) Patent No.: US 8,955,487 B2
(45) Date of Patent: Feb. 17, 2015

(54) PISTON AND COOLED PISTON RING THEREFOR AND METHOD OF CONSTRUCTION THEREOF

(75) Inventors: Keith Hampton, Ann Arbor, MI (US); Miguel Azevedo, Ann Arbor, MI (US)

(73) Assignee: Federal-Mogul Corporation, Southfield, MI (US)

( * ) Notice: Subject to any disclaimer, the term of this patent is extended or adjusted under 35 U.S.C. 154(b) by 307 days.

(21) Appl. No.: 13/370,744

(22) Filed: Feb. 10, 2012

(65) Prior Publication Data

US 2013/0206096 A1    Aug. 15, 2013

(51) Int. Cl.
*F16J 9/22*    (2006.01)
(52) U.S. Cl.
USPC ............ 123/193.6; 123/41.35; 277/226; 277/236
(58) Field of Classification Search
USPC ............ 123/193.6, 41.35; 277/236, 226
See application file for complete search history.

(56) References Cited

U.S. PATENT DOCUMENTS

| | | | |
|---|---|---|---|
| 1,741,436 A * | 12/1929 | Raule | 277/436 |
| 1,998,915 A | 4/1935 | Young | |
| 2,566,603 A | 9/1951 | De K Dykes | |
| 2,569,778 A | 10/1951 | Phillips | |
| 3,542,376 A * | 11/1970 | Dykehouse | 277/451 |
| 3,834,719 A | 9/1974 | Shin et al. | |
| 3,843,138 A | 10/1974 | Cobb | |
| 4,026,197 A | 5/1977 | Lapke et al. | |
| 4,346,685 A | 8/1982 | Fujikawa | |
| 2013/0047948 A1 * | 2/2013 | Heuschmann | 123/193.6 |

FOREIGN PATENT DOCUMENTS

| | | | |
|---|---|---|---|
| GB | 618946 A * | 3/1949 | |
| GB | 1503854 A * | 3/1978 | |
| JP | 6201043 | 7/1994 | |
| JP | 2008138520 A * | 6/2008 | |

* cited by examiner

*Primary Examiner* — Marguerite McMahon
(74) *Attorney, Agent, or Firm* — Robert L. Stearns; Dickinson Wright, PLLC

(57) ABSTRACT

A piston, piston ring and method of construction thereof is provided. The piston ring is L-shaped, having a first portion configured to extend upwardly from a ring groove of a piston along a top land of the piston and a second portion configured for receipt in the ring groove. The first and second portions of the ring have an enclosed hollow cooling chamber with a cooling medium disposed therein such that the cooling medium is free to flow internally to the piston ring groove and upwardly from the piston ring groove along the top land.

16 Claims, 5 Drawing Sheets

PISTON AND COOLED PISTON RING THEREFOR AND METHOD OF CONSTRUCTION THEREOF

BACKGROUND OF THE INVENTION

1. Technical Field

This invention relates generally to internal combustion engines, and more particularly to pistons and piston rings therefor.

2. Related Art

Engine manufacturers are encountering increasing demands to improve engine efficiencies and performance, including, but not limited to, improving fuel economy, improving fuel combustion, reducing oil consumption, increasing the exhaust temperature for subsequent use of the heat within the vehicle, increasing compression loads within the cylinder bores, decreasing weight and making engines more compact. Accordingly, it is desirable to increase the temperature and compression loads within the combustion chamber of the engine. However, by increasing the temperature and compression loads within the combustion chamber, the wear and physical demands on the piston are increased, thereby reducing its potential useful life. A particular area of concern is with the excessive heat buildup and associated wear within the piston ring region of the piston.

A piston including a piston ring constructed in accordance with this invention is able to withstand the excessive heat generated in modern high performance engines, as will become apparent to those skilled in the art upon reading the disclosure and viewing the drawings herein.

SUMMARY OF THE INVENTION

A piston ring for an internal combustion engine constructed in accordance with one aspect of the invention is L-shaped, having a first portion configured to extend upwardly from a ring groove of a piston along a top land of the piston and a second portion configured for receipt in the ring groove. The first and second portions of the ring have an enclosed hollow cooling chamber with a cooling medium disposed therein such that the cooling medium is free to flow internally to the piston ring groove and upwardly from the piston ring groove along the top land.

In accordance with another aspect of the invention, a piston for an internal combustion engine is provided. The piston has a body with a cylindrical outer surface and an annular uppermost ring groove extending into the outer surface. A top land of the piston is recessed radially inwardly from the outer surface. The top land extends from the uppermost ring groove to an upper combustion surface. The piston further includes a L-shaped piston ring having a first portion configured for receipt in the uppermost ring groove and a second portion configured to extend upwardly from the uppermost ring groove along the top land. The first and second portions of the piston ring have a hollow cooling chamber with a cooling medium disposed therein such that the cooling medium is free to flow internally to the uppermost ring groove and upwardly from the ring groove along the top land.

In accordance with another aspect of the invention, a method of constructing a piston ring for an internal combustion engine is provided. The method includes forming an L-shaped ring having a hollow cooling chamber including a first portion configured to extend upwardly from a ring groove of a piston along a top land of the piston and a second portion configured for receipt in the ring groove. Further, disposing a cooling medium in the hollow cooling chamber, and fixing end plugs in opposite ends of the hollow cooling chamber to maintain the cooling medium in the cooling chamber.

In accordance with another aspect of the invention, the method of forming the L-shaped piston ring includes forming using tubular material to form the piston ring.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
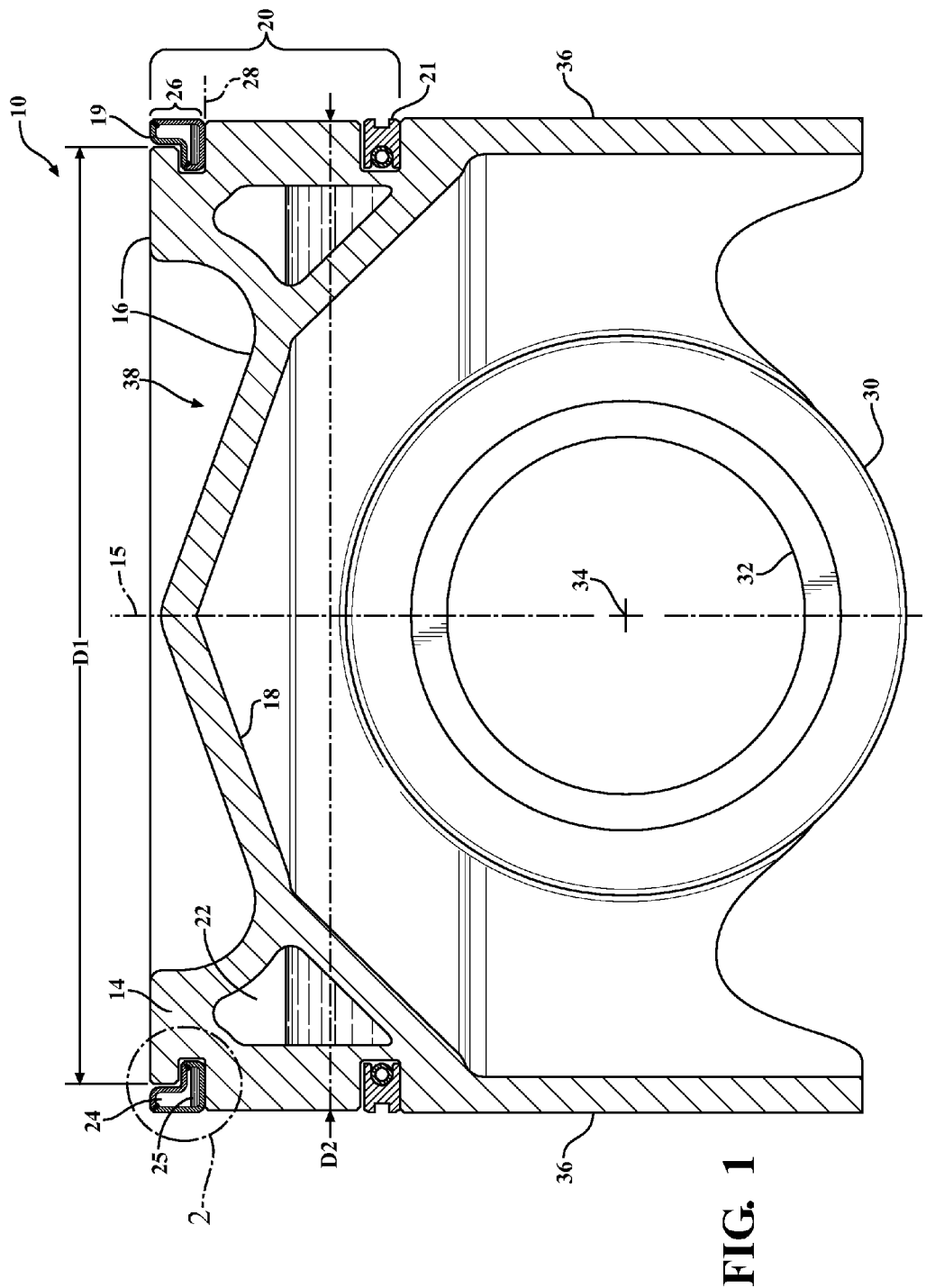
FIG. 1 is a cross-sectional view of a piston constructed in accordance with one aspect of the invention.

Referring in more detail to the drawings, FIG. 1 illustrates a cross-sectional side view of a piston 10 constructed in accordance with one presently preferred aspect of the invention for reciprocating movement in a cylinder bore 12 of a cylinder liner 13 (FIGS. 2 and 2A) in an internal combustion engine, such as a modern, compact, high performance vehicle engine, for example. The piston 10 has a body 14, shown as a single, monolithic piece of cast material or formed from either forged or billet materials, by way of example, extending along a central longitudinal axis 15 along which the piston 10 reciprocates in the cylinder bore 12. The body 14 is formed including an upper combustion wall having on one side an upper combustion surface 16 configured for direct exposure to combustion gases within a cylinder bore and on an opposite side an undercrown surface 18 located directly and axially beneath the upper combustion surface 16. The piston body 14 is also formed having a ring belt region 20 adjacent the upper combustion surface 16 wherein the ring belt region 20 is configured for receipt of at least one piston ring, shown as first and second piston rings 19, 21, respectively. Further, the piston body 14 is formed including cooling gallery, shown as a closed or substantially closed cooling gallery 22, by way of example. The cooling gallery 22 is configured radially inwardly and in substantial radial alignment with the ring belt region 20. The first piston ring 19 is generally L-shaped, having a hollow annular cooling chamber 24 for receipt of a cooling medium 25, such as an inert gas, e.g. argon and/or liquid coolant. The second piston ring 21 is spaced axially downwardly from the first piston ring 19 and is provided as a standard oil control ring that wipes excess oil from the cylinder liner 13 and returns the oil to the crankcase. The first piston ring 19 provides enhanced cooling to a reduced diameter upper land region 26 that extends from a lower, planar surface 28 of the first piston ring 19 upwardly to the upper combustion surface 16. Accordingly, heat generated within this region is transferred from the piston body 14 and the first piston ring 19 to the cylinder liner 13, thereby prolonging the useful life of the piston 10.

The piston body 14 has a pair of pin bosses 30 depending from the undercrown surface 18 to provide laterally spaced pin bores 32 coaxially aligned along a pin bore axis 34 that extends generally transverse to the central longitudinal axis 15. The pin bosses 30 are joined to laterally spaced skirt portions 36 that are diametrically spaced from one another laterally across opposite sides the pin bore axis 34 and have convex outer surfaces contoured for cooperation within the cylinder bore 12 to facilitate maintaining the piston 10 in its desired orientation as it reciprocates through the cylinder bore 12.

The upper combustion surface 16 is represented as having a recessed combustion bowl 38 to provide a desired gas flow within the cylinder bore. At least in part due to the combustion bowl 38, relatively thin regions of piston body material are formed between the combustion bowl 38, the cooling gallery 22 and the undercrown surface 18. As such, in use, these regions need to be properly cooled, such as via a cooling medium flowing through the cooling gallery 22 and against the undercrown surface 18 within a central gallery region between the pin bosses 30. The undercrown cooling could be provided by oil splashes, oriented cooling oil jets or via oil within the central gallery region.

To further facilitate cooling of the upper land region 26, the hollow first piston ring 19, with a coolant medium 25 disposed therein, is disposed between an annular outer wall 40 of the upper land region 26 and the cylinder liner 13. The outer wall 40 extends downwardly from the upper combustion surface 16. The outer wall 40 is formed having a diameter D1 that is reduced from the maximum diameter D2 of the ring belt region 20 that depends from the upper land region 26, thereby providing an annular gap or space 42 sized for receipt of an upstanding first portion 44 of the first piston ring 19 between the outer wall 40 and the cylinder liner 13. The diameter D1 is sized so that the first portion 44 of the first piston ring 19 is free to float between the upper land region 26 and the cylinder liner 13, thereby being able to automatically find its desired sliding orientation. To further accommodate and locate the first piston ring 19, an annular ring groove 46 extends radially inwardly into the reduced diameter outer wall 40 of the upper land region 26, wherein the ring groove 46 is sized for receipt of a laterally extending second portion 48 of the first piston ring 19. The ring groove 46 is sized so that the second portion 48 of the first piston ring 19 is free to float therein, thereby further allowing the piston ring 19 to automatically find its desired sliding orientation.

The first piston ring 19 is generally L-shaped, with the first portion 44 providing the upstanding or vertically extending leg of the L-shaped configuration and the second portion 48 providing the laterally or horizontally extending leg of the L-shaped configuration. The first portion 44 is received in the annular space 42 and the second portion 48 is received in the ring groove 46. The first piston ring 19 has a cylindrical outer surface 50 sized for close sliding movement with the cylinder liner 13 to provide the desired sealing between the piston upper land region 26 and the cylinder liner 13. The outer surface 50 extends along an upstanding outer leg 52 of the first portion 44 in parallel or substantially parallel relation with the longitudinal axis 15. The first portion 44 also has an upstanding inner leg 54 spaced radially inwardly from the outer leg 52 by a portion of the cooling chamber 24 and a radially extending upper leg 56 extending between the outer and inner legs 52, 54. The upper leg 56 has an uppermost surface extending flush or substantially flush with the upper combustion surface 16.

The second portion 48 of the first piston ring 19 has radially extending upper and lower legs 58, 60, respectively, spaced from one another by a portion of the cooling chamber 24 and a radially innermost upstanding leg 62 extending between the upper and lower legs 58, 60. The upper and lower legs 58, 60 having outer surfaces dimensioned for a loose fit within the ring groove 46 while the upstanding leg 62 has a radially innermost surface dimensioned for a loose fit within the ring groove 46, thereby allowing the piston ring to float freely within the ring groove 46 during use. Accordingly, the piston ring 19 is able to automatically position itself in sealing engagement with the cylinder liner 13.

Figure 2:
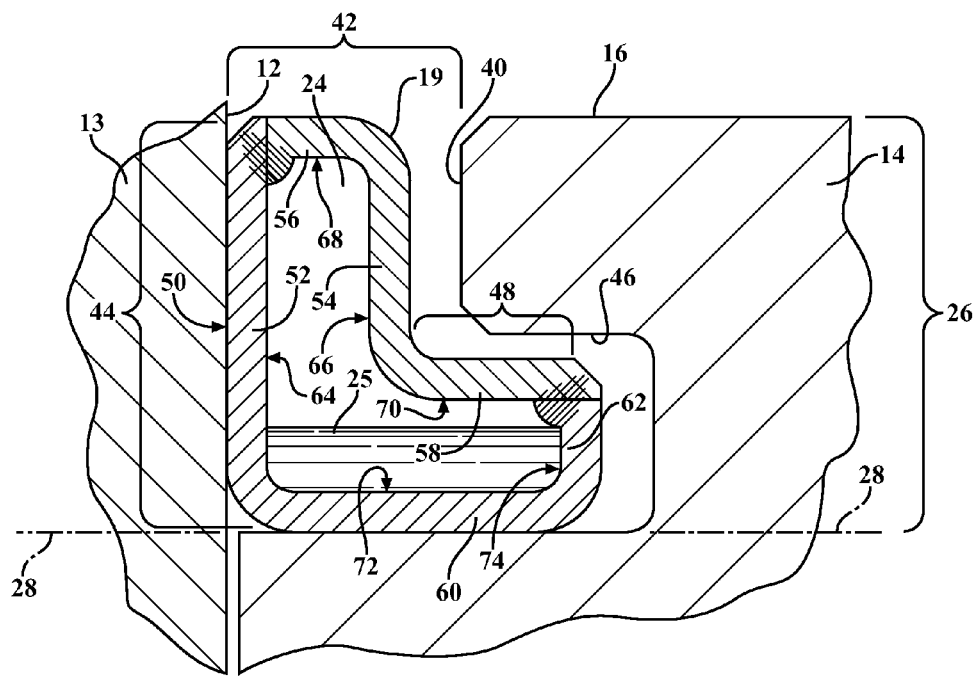
FIG. 2 is an enlarged cross-section view of the encircled region of the piston of FIG. 1.
Figure 2A:
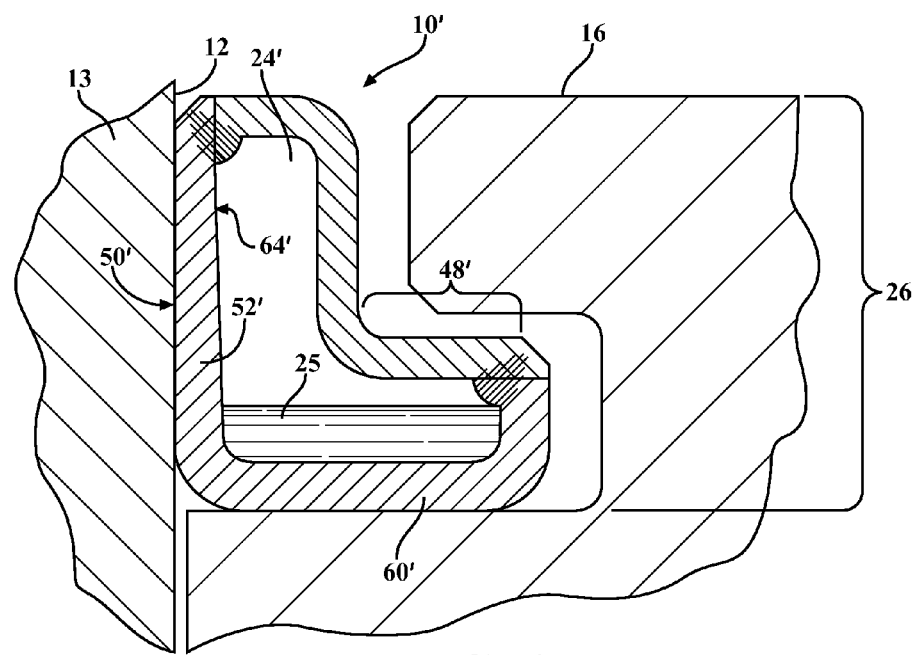
FIGS. 2A-2D are views similar to FIG. 2 of piston rings constructed in accordance with additional aspects of the invention.

The enclosed piston ring cooling chamber 24 is bounded by inner surfaces 64, 66, 68 of the outer, inner and upper legs 52, 54, 56, respectively, and inner surfaces 70, 72, 74 of the upper, lower and upstanding legs 58, 60, 62, respectively. The inner surfaces 64-74 are configured such that during use, the coolant medium 25 is sloshed throughout the cooling chamber 24 in "cocktail shaker" like fashion to provide optimized cooling to the surrounding upper land region 26. As shown in FIG. 2, the inner surfaces 64, 66 are parallel or substantially parallel with one another, and the inner surfaces 70, 72 are parallel or substantially parallel with one another, and the wall thickness of the piston ring 10, as shown in cross-section, is uniform throughout. In contrast, as shown in FIG. 2A in accordance with a further aspect of the invention, the wall thickness of a piston ring 10' constructed in accordance with another aspect of the invention, as shown in cross-section, is non-uniform throughout. In particular, an upstanding outer leg 52' has a non-uniform thickness extending along its length, such that the thickness is continuously or substantially continuously varying along its entire length, with thinnest region located at an uppermost end of the outer leg 52' and a thickest region located at a lowermost end of the outer leg 52'. An outer surface 50' extends parallel or substantially parallel with the longitudinal axis 15, and thus, given the thickness is non-uniform, an inner surface 64' extends in oblique relation to the longitudinal axis 15 and the pin bore axis 34. As shown, the inner surface 64' diverges radially outwardly as its extends upwardly toward the upper combustion surface 16 and away from the lower leg 60' of the second portion 48'. The inclined inner surface 64' facilitates cooling of the upper land region 26 by altering the fluid flow dynamics of the coolant medium 25 within the cooling chamber 24', thereby enhancing the transfer of heat from the inner diameter of the first ring 19' to its outer diameter region whereupon the heat is readily transferred to the cylinder liner 13. As the coolant medium 25 flows downwardly or otherwise moves downwardly relative to the inclined inner surface 64', the coolant medium is caused to flow radially inwardly, thereby facilitating the agitation of the coolant medium throughout the entire cooling chamber 24'.

Figure 3:
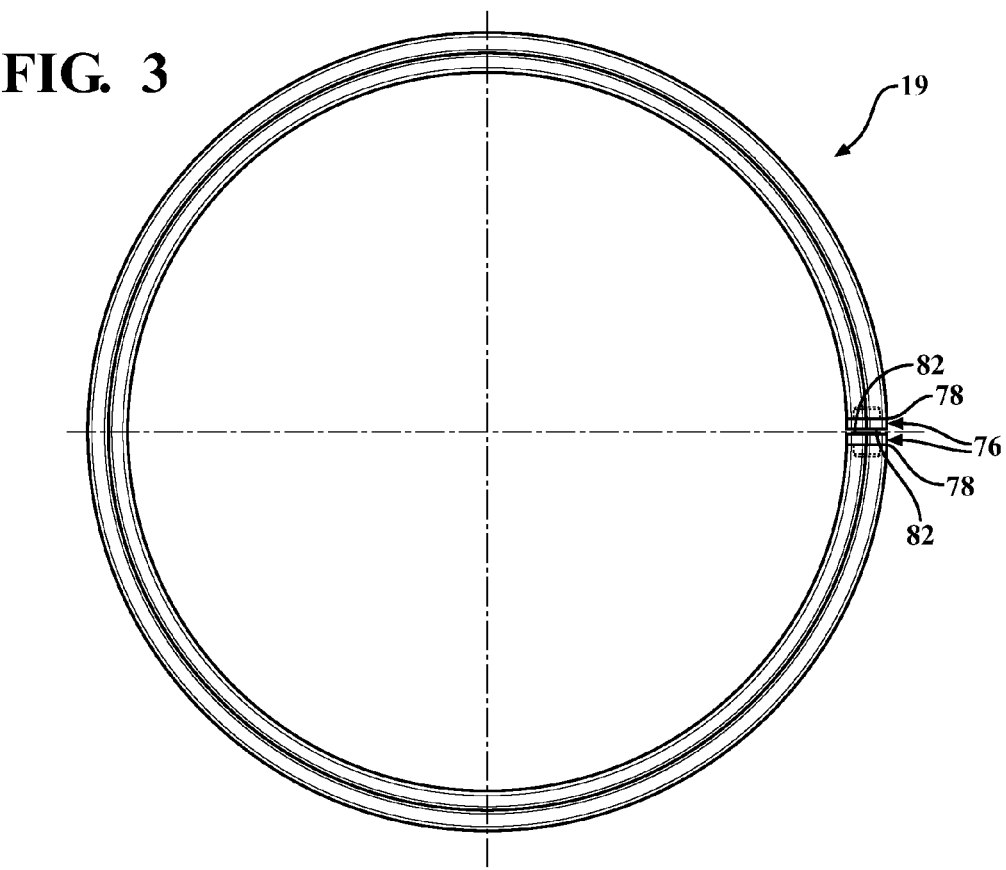
FIG. 3 is a top view of the piston rings of FIGS. 2 and 2A-2D.
Figure 4:
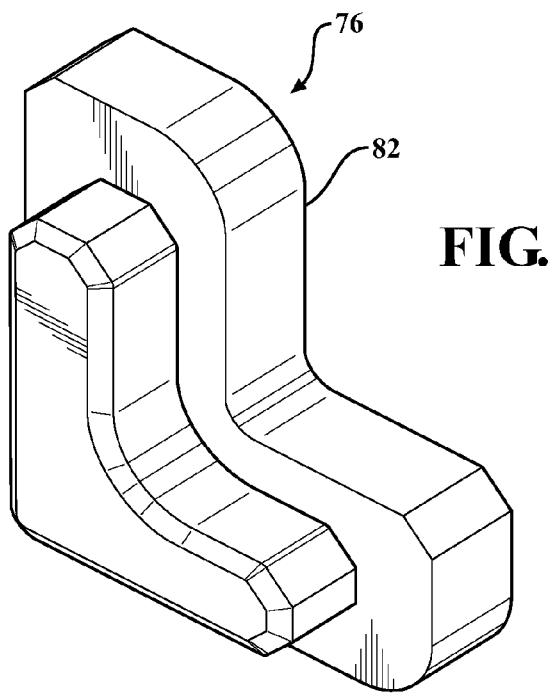
FIG. 4 is perspective view of an end cap of the piston rings.

As shown in FIG. 3, the first piston ring 19 is formed having a pair of end caps 76 (FIG. 4) that act to plug opposite free ends 78, 80 of the cooling chamber 24. Accordingly, the coolant medium 25 is maintained within the cooling chamber 24 and kept from leaking outwardly therefrom. The end plugs 76 can be fixed with the free ends 78, 80 via any suitable mechanism, including adhesives and/or weld joints, for example. Upon being fixed within the free ends 78, 80, end faces 82 of the end plugs 76 can be configured to abut one another under a bias force of the ring structure, or preferably to be located in slightly spaced relation from one another, thereby providing an ability to be slightly collapsed toward one another upon installation within the cylinder liner 13, which in turn acts to provide a radially outwardly acting spring bias of the first piston ring 19 against the cylinder liner 13 to perfect a seal thereagainst.

In manufacture, as best shown in FIGS. 2 and 2A, the piston ring 19 can be constructed from a plurality of separate pieces of flat sheet metal material, wherein the individual, relatively long and narrow pieces of the sheet material are cold formed, such as in a progressive die stamping operation, for example, to take on a cylindrical configuration and then are cold formed or otherwise stamped to attain their respective unground finished shapes. Then, upon forming the individual pieces, the pieces are fixed to one another, including the end plugs 76, via a weld or braze joint, or suitable adhesive for the end plugs 76, then finish processes can be performed, such as grinding and coating, for example, to complete manufacture of the piston ring 19. It should be recognized that prior to completely sealing off the cooling chamber 24, the coolant medium, which can be provided as a solid material at ambient temperature and pressure, or a an inert gas, e.g. argon, is disposed within the cooling chamber 24. In the embodiments of FIGS. 2 and 2A, the piston rings 10, 10', by way of example and without limitation, are formed from two separate pieces of stamped flat sheet material. As shown in FIG. 2A, the inner surface 64' can be cold formed, such as via coining or otherwise, or machined or ground, for example, to form the inclined surface. The grinding operation performed after fixing the separate pieces to one another is performed to provided the finished sized, with the ground surfaces providing an allowance of space to accommodate the desired coating thickness. The desired coating can be applied by, optionally nitriding the ground surface, applying a wear resistant coating, such as in a PVD operation, for example.

Figure 2B:
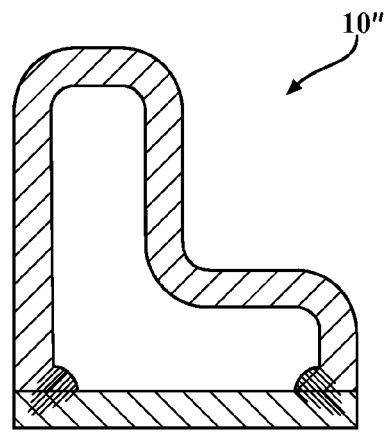
Figure 2C:
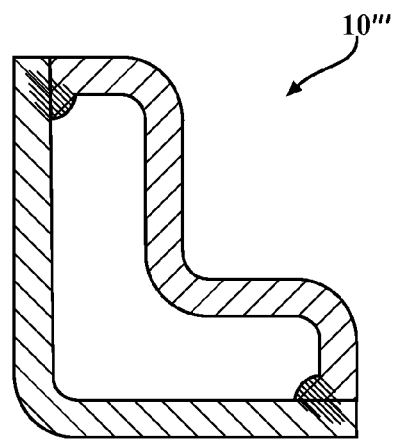
Figure 2D:
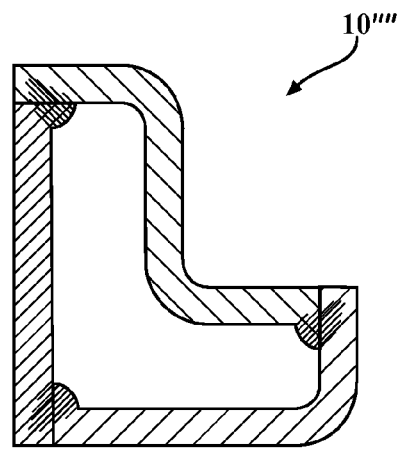

In FIGS. 2B-2D, piston rings 10", 10"', 10"" are shown as constructed in accordance with further aspects of the invention. The finished configurations are similar to the embodiment of FIG. 2, however, as shown, the individual pieces of metal strip material are shaped differently from those of FIG. 2. In FIG. 2B a flat piece of strip material in fixed to a stamped piece of strip material; in FIG. 2C, one of the pieces of material is substantially L-shaped while the other is generally M or W shaped; and in FIG. 2D, three pieces of separate strip material are fixed to one another, though it should be recognized that any suitable number of separate pieces of strip material could be used.

Figure 5A:
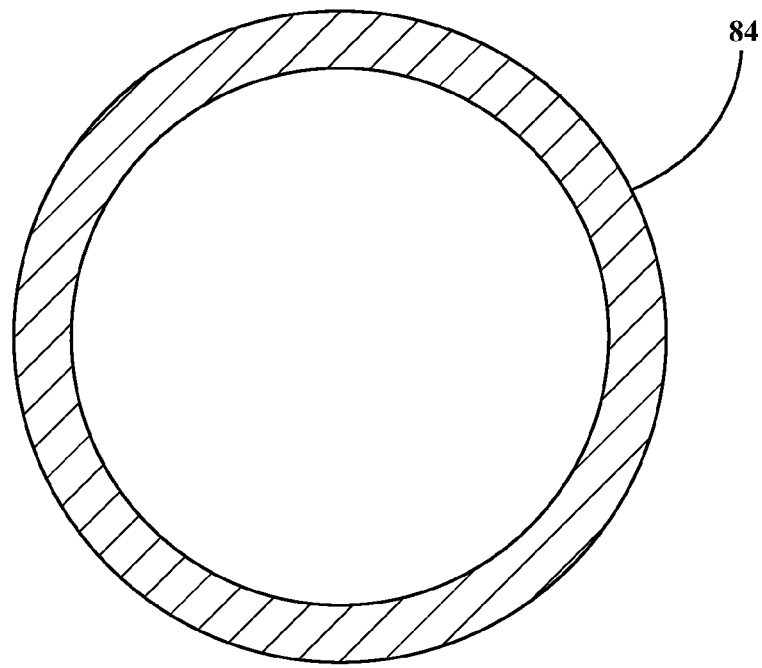
FIG. 5A is a cross-sectional view of tubular member prior to being formed into a piston ring constructed in accordance with the invention.
Figure 5B:
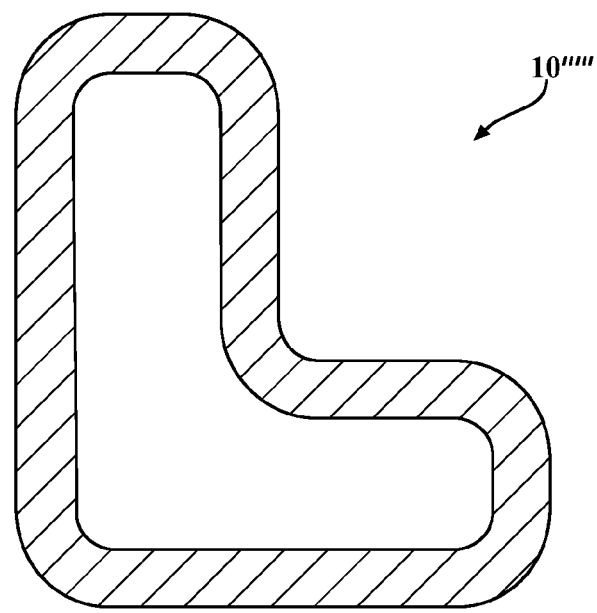
FIG. 5B is a cross-sectional view of the tubular member of FIG. 5A after being formed into a piston ring constructed in accordance with the invention.

In FIG. 5B, a piston ring 10""' is shown as constructed in accordance with a further aspect of the invention. The piston ring 10""', rather than being formed from a plurality of separate pieces of strip metal fixed to one another, is formed from a solid piece of tubular metal 84 (FIG. 5A). The piston ring 10""' is ultimately formed having the same end shape, and thus, the shape is not discussed in further detail here. The tubular piece of metal can be formed having the desired end shape, such as in a cold forming operation, e.g. stamping or extrusion, and then cut and curled into its round configuration, as shown in FIG. 3. Of course, the process steps can be altered such that the tubular piece of material 84 can be cut to length first, and then formed to attain its finished configuration, e.g. curling and forming or forming and curling. Then, end plugs 76 are installed in the open ends as discussed above.

Obviously, given the detailed description of presently preferred embodiments discusses above, many modifications and variations of the present invention are possible in light of the above teachings. It is, therefore, to be understood that within the scope of the appended claims, the invention may be practiced otherwise than as specifically described.

What is claimed is:

1. A piston ring for an internal combustion engine, comprising:
    a L-shaped ring having a first portion configured to extend upwardly from a ring groove of a piston along a top land of the piston and a second portion configured for receipt in the ring groove, said first and second portions of said ring having an enclosed hollow cooling chamber with a cooling medium disposed therein such that the cooling medium is free to flow internally to the ring groove and upwardly from the ring groove along the top land, wherein said first portion has a wall with an outer surface configured for sliding movement against a cylinder line and an inner surface bounding a portion of said cooling chamber, said wall having a substantially continuously varying thickness that continuously decreases in thickness along a direction extending axially away from said second portion.

2. The piston ring of claim 1 wherein said L-shaped ring is constructed from a plurality of separate pieces of material.

3. The piston ring of claim 2 wherein said plurality of separate pieces of material are bonded to one another via one of a weld or braze joint.

4. The piston ring of claim 2 wherein at least one of said plurality of separate pieces is cold formed.

5. The piston ring of claim 2 wherein said enclosed hollow cooling chamber is closed off at opposite ends by end plugs.

6. The piston ring of claim 5 wherein said end plugs have end faces spaced from one another while said ring is in a relaxed, unbiased state.

7. The piston ring of claim 1 wherein said inner surface diverges radially outwardly continuously from said second portion.

8. A piston for an internal combustion engine, comprising:
    a body with a cylindrical outer surface and an annular uppermost ring groove extending into said outer surface with a top land recessed radially inwardly from said outer surface, said top land extending from said uppermost ring groove to an upper combustion surface; and
    a L-shaped piston ring having a first portion configured for receipt in said uppermost ring groove and a second portion configured to extend upwardly from said uppermost ring groove along said top land, said first and second portions of said piston ring having a hollow cooling chamber with a cooling medium disposed therein such that the cooling medium is free to flow internally to said uppermost ring groove and upwardly from said ring groove along said top land, wherein said first portion has a wall with an outer surface configured for sliding movement against a cylinder liner and an inner surface bounding a portion of said cooling chamber, said wall having a substantially continuously varying thickness that decreases in thickness along a direction extending axially away from said second portion.

9. The piston of claim 8 wherein said body has a closed cooling gallery with a coolant medium disposed therein.

10. The piston of claim 9 wherein said inner surface diverges continuously radially outwardly along a direction extending upwardly away from said second portion.

11. A method of constructing a piston ring for an internal combustion engine, comprising:
    forming a L-shaped ring having a hollow cooling chamber including a first portion configured to extend upwardly from a ring groove of a piston along a top land of the piston and a second portion configured for receipt in the ring groove, wherein said first portion is formed having a wall with an outer surface configured for sliding movement against a cylinder liner and having an inner surface bounding a portion of said hollow cooling chamber, and said wall is formed having a substantially continuously varying thickness that continuously decreases in thickness along a direction extending axially away from said second portion;

disposing a cooling medium in the hollow cooling chamber; and fixing end plugs in opposite ends of the hollow cooling chamber to maintain the cooling medium in the cooling chamber.

12. The method of claim 11 further including forming the L-shaped ring from a plurality of separate pieces of metal strip material.

13. The method of claim 12 further including fixing the plurality of separate pieces of metal strip material to one another via a weld or braze joint.

14. The method of claim 13 further including cold forming the plurality of separate pieces of metal strip material.

15. The method of claim 11 further including forming the L-shaped ring from tubular material.

16. The method of claim 15 further including extruding the tubular material to take on its L-shape.

* * * * *